Oct. 14, 1952 A. G. TYNAN 2,614,213
SIGNAL ACTUATED TUNER CONTROL
Filed April 1, 1950
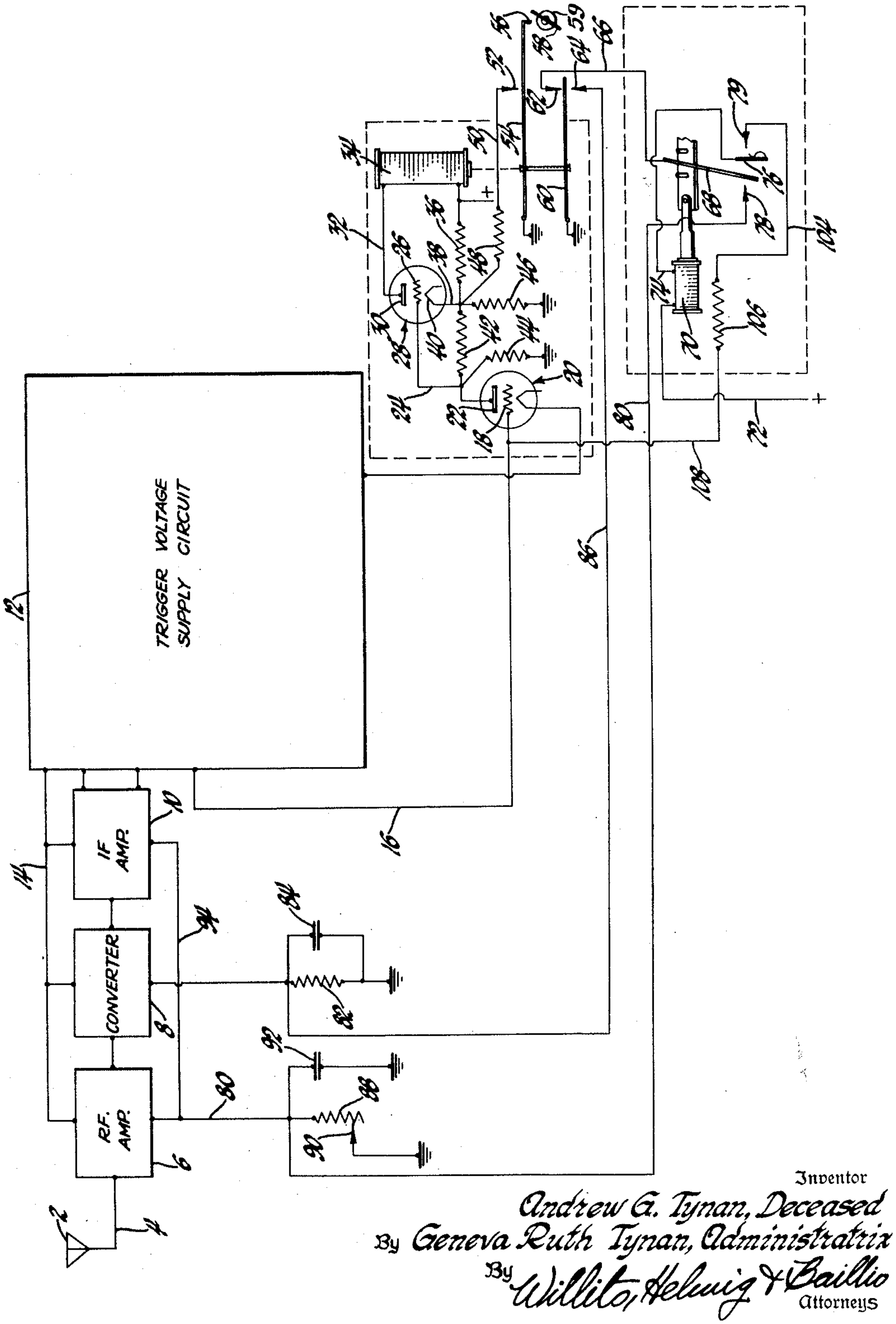
Inventor
Andrew G. Tynan, Deceased
By Geneva Ruth Tynan, Administratrix
By Willits, Helwig & Baillio
Attorneys Patented Oct. 14, 1952 2,614,213

UNITED STATES PATENT OFFICE 2,614,213

SIGNAL ACTUATED TUNER CONTROL

Andrew G. Tynan, deceased, late of Kokomo, Ind., by Geneva Ruth Tynan, administratrix, Kokomo, Ind., assignor to General Motors Corporation, Detroit, Mich., a corporation of Delaware Application April 1, 1950, Serial No. 153,442

3 Claims. (Cl. 250—20)

This invention relates to automatic tuning means for radio receiving apparatus and more specifically to that type of tuning means which is referred to as signal actuated tuning means. In all of the types of signal actuated equipment some means is provided for scanning the frequency band of the receiver, either by a small electric motor which drives the variable tuning means or by some other force-applying mechanism to cause the tuner to slowly scan the band. It is also usual to utilize for signal reception such scanning in one direction only and during the scanning if an incoming signal is picked up, that signal, through certain apparatus, operates a relay to cause the scanning means to stop or lock in and the set will then be in tune on that station. In tuners of this type in which the signal seeking scanning occurs in one direction only, the return to the opposite end of the spectrum occurs much more rapidly so that the tuner can again repeat the scanning action as desired, and during this recovery or drive back to the initial point, it is, of course, undesirable to have the signal actuated pulse attempt to stop the tuner on the back travel.

It is, therefore, an object of the invention to provide means for squelching any control signal which might tend to operate the indexing means upon travel of a scanning tuner in one direction.

It is a further object of the invention to provide means to maintain the triggering circuit controlling the relay from operation during the back or return travel of the scanning tuning means.

With these and other objects in view which will become apparent as the specification proceeds, the invention will be best understood by reference to the following specification and claims and the illustrations in the accompanying drawings, in which:

The figure is a schematic wiring diagram showing the essential features of the invention.

As stated generally above, the tuning means for a radio receiver is provided with a source of energy for causing the tuning means to move over its span of travel and in so doing cause the receiver to be tuned over the spectrum for which it was designed. During the scanning action, upon a pulse provided to a triggering system, means is provided to stop or index the driving means at that point to accurately tune in the station being received. Since the present invention relates only to the triggering and control means for the driving tuning means, other portions of the complete system have been shown in block diagram, only that portion with which we are particularly interested being shown in detail.

Referring now more particularly to the figure, there is shown therein an antenna 2 which is connected through input 4 to the radio frequency amplifier 6 which is in turn connected through a converter 8 to an intermediate frequency amplifier 10, the output of which is fed into a detector and audio amplifier section 12, which also acts to supply a trigger voltage for indexing. This trigger voltage is, as is somewhat common, generated by the so-called AVC or automatic volume control of the receiver, which is normally fed back over a line such as 14 to the various stages of the amplifier in inverse phase to decrease amplification upon signal strength increase or increase amplification upon signal strength decrease. A voltage derived from this circuit and used as a control voltage for the triggering system shown in the lower right hand portion of the drawing is fed over a line 16 to the control grid 18 of a triode tube 20, the plate 22 of which is directly connected through line 24 to control grid 26 of a second triode 28. The plate 30 of the second triode is connected through line 32 to control relay 34, the opposite terminal of which is connected through resistor 36 back to line 38, in turn connected to cathode 40 of the tube 28.

A resistor 42 is connected between line 38 and line 24, or in other words, across the grid and cathode. A resistor 44 is connected between line 24 and ground and a resistor 46 between line 38 and ground. Resistor 48 has one terminal connected to line 38, and its opposite terminal connected through line 50 to stationary contact 52 cooperating with movable armature 54 of the relay 34. Armature 54 has one end grounded and is pivoted about that same end, its other end being turned down as at 56 to form an indexing stop for a portion of the driving mechanism such, for example, as a rotating vane 58 of an air governor, or any other movable part of the driving tuner means 59.

A second movable armature 60, mechanically moved with the first armature 54, has its pivoted end grounded and oscillates between two fixed contacts 62 and 64, contact 62 being connected through line 66 with a pivoted armature 68 of a cocking relay 70 for the main drive such as a spring motor 59. Relay 70 has one terminal connected through line 72 to a source of power such as a battery and the other terminal connected through line 74 with a movable switch contact 76. Two spaced stationary contacts 78 and 79 complete the switch arrangements engaged by the oscillating armature 68 when at limits of its movement, contacts 76 and 79 are forced together by contact arm 68 at one end of the latter's travel and contact 78 is, of course, engaged at the opposite limit of movement. Contact 78 is connected through line 80 with one end of a resistor 88, which has an adjustable tap 90 associated therewith which is grounded. A condenser 92 is connected to ground from the junction of line 80 and resistor 88. Line 80 then extends to the cathodes of the R. F. amplifier 6 and through line 94 to the cathodes of the I. F. amplifier 10.

Contact 64, which cooperates with armature 60 of the first relay, is connected through line 86 with one end of a resistor 82, the other end of which is grounded. In like manner a condenser 84 is connected from one terminal of the resistor 82 to ground. Line 86 then continues to the cathodes of the converter 8. Stationary terminal 79 is connected through line 104 to a limiting resistor 106 and through the same through line 108 to line 16 which is directly connected to the grid 18 of the trigger tube 20.

In the operation of this system, it will be seen that during the tuning cycle or during the time that the tuning means is being moved over the spectrum, the relay coil 34 is energized, maintaining its armatures 54 and 60 in their raised position so that the indexing tip 56 of armature 54 is moved to one side and will permit the tuning motor to operate, also closing the circuits associated with these armatures in their uppermost position. As the tuning motor moves the tuning means over the spectrum, it eventually reaches a position adjacent one extremity of its travel, at which time a mechanical stop on the tuning means engages the movable arm 68, which is toggle spring biased to either extreme position and moves it from a position in engagement with stationary contact 78 to the opposite extreme position where it contacts switch contact 76 and moves the latter against stationary contact 79. This switch is so constructed that when no pressure is applied to contact 76, it is spring biased to normally remain a short distance from stationary contact 79, but when the arm 68 snaps against it, it is forced into contact with stationary contact 79 and an electrical conductive circuit is completed between all three parts, namely 68, 76 and 79.

This completes a circuit through cocking relay coil 70 as follows: line 72 from the source of power, relay 70, line 74, contact 76, arm 68, line 66, contact 62, and armature 60 to ground. This cocking relay then attracts its armature to pull the tuning carriage immediately to its opposite extremity, re-cocking the spring motor for tuning which, as an illustration, may be any type of spring motor to drive the tuning mechanism. Upon solenoid energization, therefore, the tuning carriage is rapidly moved to its opposite extreme position in which the switch arm 68 is then actuated during the last portion of its travel to snap over and remain in engagement with stationary contact 78 during the longer tuning cycle. Thus, the armature 68 only remains in contact with switch contacts 76 and 79 for that short period of time during which the cocking relay 70 is energized and the carriage is being moved back to its fully cocked or remote position. It is during this period that it is desired to remove any possibility of an incoming signal providing a stopping pulse and the desired deenergization of the triggering system during this time is provided by the grounding circuit through line 108, resistor 106, contact 79, contact 76, switch arm 68, line 66, stationary contact 62 and grounded armature 60.

However, before explaining the full import of that conductive circuit, the normal operation of the triggering system will be explained. Assuming now that the tuner is moving slowly over the frequency band in search of an incoming signal, tube 28 is, therefore, conducting in order to maintain relay 34 energized and its armatures in their raised position. Index arm 56 has been removed from engagement with the tuning means and it may, therefore, rotate. Armature 60 is in its raised position to complete a circuit to the tuner sensitivity control through contact 62, line 66, arm 68, contact 78, line 80, resistor 88 and condenser 92, which are the elements controlling the sensitivity, on to the cathodes of the R. F. and I. F. amplifiers. This provides a variable sensitivity for the set during the tuning interval as selected by the operator.

Assuming now that an incoming station generates a signal on the line 16, tube 20, which has heretofore been nonconductive, receives a triggering voltage pulse on its grid, which permits it to conduct. Upon a flow of plate current in the circuit of plate 22 the grid 26 of the next tube 28 is lowered in potential due to the voltage drop across resistor 42 and cuts off the flow through tube 28, thus deenergizing tube 28 and relay 34 and causing armatures 54 and 60 to drop. The falling of armature 54 imposes a mechanical index in the path of the tuning mechanism and it stops immediately. The falling of armature 60 breaks the circuit through the sensitivity control circuit including variable resistor 88, 90 and the condenser 92, and inserts instead sensitivity control means 82, 84. Thus, when the receiver is being tuned automatically a sensitivity of adjusted value dictated by the desire of the operator is imposed upon the receiver whereas when the set is tuned and a station is being received, a fixed sensitivity may be used, dictated by the desire of the designer in his selection of elements 82, 84.

Assuming now that the tuner has reached its limit of movement, and the spring motor has pulled the tuner carriage to a point to cause it to snap over the toggle action switch 68 to cause it to engage switch contact 76—79, this, of course, closes the circuit to the cocking relay coil 70, and it immediately starts to pull the carriage back to its opposite extreme position. At the same time a circuit is completed from the grid 18 of the tube 20 to ground through resistance 106 to maintain tube 20 non-conductive so that it cannot trigger and cause the relay 34 to become deenergized and the receiver to stop on any station. Thus, there is no danger of any erratic or erroneous stopping on station during the cocking action of the relay but only when the relay is properly scanning the spectrum in the correct direction is it possible for the pulse generated in the detector on line 16 to cause the system to be triggered to stop.

What is claimed is:

1. In radio receiving apparatus, power actuated tuning means for scanning the spectrum between prescribed limits, conductive means upon which a voltage is developed by an incoming signal, electronic means having a control element connected to the conductive means and in turn controlling the power actuated means, a grounding circuit connected to the control element, and switching means in the grounding circuit located in the path of movement of the power actuated means and operated by movement thereof to disable the electronic control means during a portion of the cycle of the power actuated means.

2. In radio receiving means, power actuated tuning means for scanning the spectrum between prescribed limits, relay means connected to control the power actuated means, electronic tube means having a control element connected to control the relay means, conductive means upon which a voltage is developed by an incoming signal connected to the control element and determining the electronic tube operation, grounding means connected to the control element, and switching means connected between the grounding means and the control element and in the path of movement of the power actuated means to ground said element during determined portions of tuning means travel.

3. In radio receiving apparatus, power actuated tuning means for repetitively scanning a predetermined portion of the spectrum, the speed in one direction being much higher than in the other, relay means to control the operation of the power actuated means, a plurality of electron tubes connected in cascade, the second tube connected to said relay means, a control element in said first tube, conductive means upon which a voltage is developed by an incoming carrier signal connected to said control element to cause said tube to conduct upon the appearance of a signal and bias the second tube to be nonconductive and the relay to become deenergized, a grounding circuit connected to the control element, switching means in the grounding circuit in the path of the power actuated means to close said circuit upon the power actuated means reaching one end of its travel to disable the first tube during back travel.

GENEVA RUTH TYNAN,
*Administratrix of the Estate of Andrew G. Tynan, Deceased*

REFERENCES CITED

The following references are of record in the file of this patent:

UNITED STATES PATENTS

| Number | Name | Date |
|---|---|---|
| 2,493,741 | Andrews | Jan. 10, 1950 |
| 2,499,573 | Dunn | Mar. 7, 1950 |